S. C. RAND.
METHOD OF FORMING TIRE CASINGS.
APPLICATION FILED JULY 31, 1917.
1,248,713.
Patented Dec. 4, 1917.
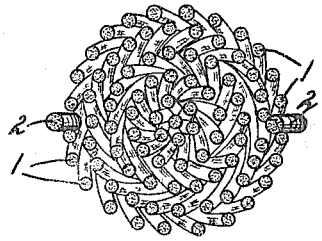
Fig. II.
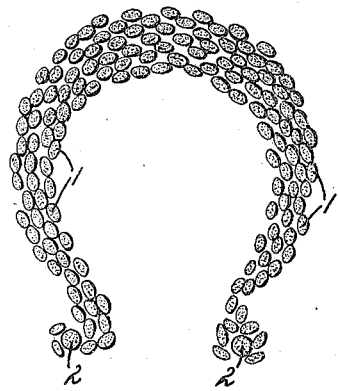
Fig. I.
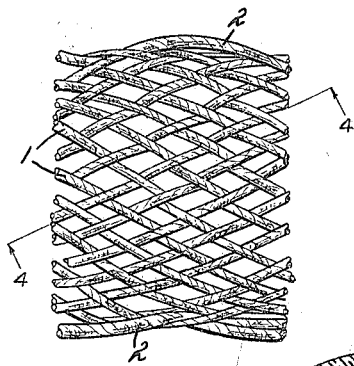
Fig. III.
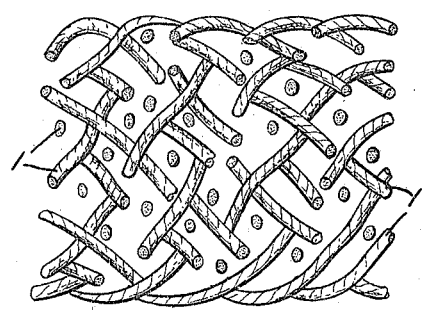
Fig. IV.
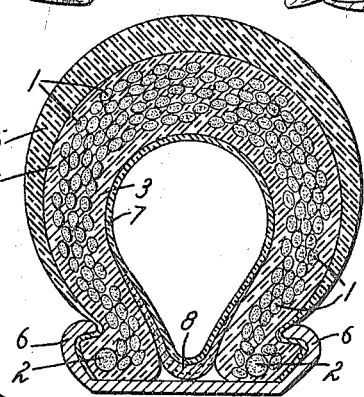
Fig. V.
WITNESSES:
Lerm Gilman
Luther Blake
INVENTOR.
SILAS C. RAND
BY Chappell Earl
ATTORNEYS.

UNITED STATES PATENT OFFICE.

SILAS C. RAND, OF CHICAGO, ILLINOIS.

METHOD OF FORMING TIRE-CASINGS.

1,248,713.   Specification of Letters Patent.   Patented Dec. 4, 1917.

Application filed July 31, 1917. Serial No. 183,733.

*To all whom it may concern:*

Be it known that I, SILAS C. RAND, a citizen of Great Britain, residing at Chicago, county of Cook, State of Illinois, have invented certain new and useful Improvements in Methods of Forming Tire-Casings, of which the following is a specification.

This invention relates to a method of forming tire casings.
The main objects of my invention are:

First, to provide a novel method of forming a tire casing in which the strands thereof are interbraided in every direction and thereby well adapted to sustain the various stresses to which it is subjected in use.

Second, to provide a method of forming an improved tire casing which is very durable and at the same time comparatively inexpensive.
Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a cross section of the loosely braided rope from which the fabric portion of my improved tire is conformed.
Fig. II is a cross section of the loosely braided rope after being conformed to substantially the desired cross section of the tire casing to be formed.

Fig. III is a plan view of the loosely braided rope partially flattened out in the conforming process.

Fig. IV is a more or less diagrammatical section taken on a line corresponding to line 4—4 of Fig. III.
Fig. V is a transverse section of the finished tire casing showing the same mounted upon a rim of a wheel and the inner tube and tube protector in position inside of said casing.
In the drawing, similar reference characters refer to similar parts throughout the several views, and the sectional views are taken looking in the direction of the little arrows at the ends of the section lines.
It is desired to mention that the illustrations of the rope fabric portions are more or less conventional owing to the fact that the views might be very greatly varied.

In forming my improved tire casing, I first loosely braid a plurality of strands 1 into a rope, as shown in Fig. I, and at opposite portions thereof I interweave the bead strands 2. By means of suitable forms I conform the loosely braided rope into a substantially U-shape cross section, such as shown in Fig. II, or any other desired cross section. After the rope is thus conformed, I embed the strands of the rope in rubber to completely fill all the spaces between the strands thereof and form inner and outer facings 3 and 4, respectively. The partially formed casing is then vulcanized to the desired degree, after which the outer tread 5, usually formed of a different quality of rubber from that used for embedding the strands, is applied to the outer casing 4, and the entire casing is then vulcanized to the desired degree to give the rubber the proper consistency and to unite the outer tread 5 to the outer facing.

In Fig. V the improved tire produced by the above method is shown mounted upon a conventional type of clencher rim 6 with an inner tube 7 and protector 8 therein.

The strands of the rope from which the casing is formed are braided quite loosely so that the rope may be compressed and conformed into the desired shape, and when so compressed and shaped the fabric is formed of strands interbraided and interlocked in every direction and extending longitudinally and transversely across the tire.

The tire is very resilient and may be subjected to a great deal of flexing movement without serious injury to the fabric. It is economical to produce and at the same time has great strength and durability and may be used under less pressure than tires as commonly constructed without injury thereto.

While I have illustrated one method of braiding the rope from which the tire is to be conformed, it should be understood that my invention is not necessarily limited to a method which includes the braiding of a rope in this particular manner, but that the rope may be braided in any manner as long as it is braided sufficiently loose to permit the proper conformation and embedding thereof and at the same time have the strands thereof in every direction in the conformed casing.

I desire the word "rubber" to be understood as including or comprehending any suitable composition which may be used as a substitute therefor.

Having thus described my invention, what I claim as new and desire to secure by Letters Patent, is:

1. A method of forming a tire casing which comprises the steps of forming a loosely braided rope having bead strands interwoven with strands at the opposite sides thereof, conforming the rope to a U-shape cross section, embedding the conformed strands in rubber to completely fill the spaces between the strands and form inner and outer facings, suitably vulcanizing the resulting structure, applying an outer tread to the outer facing, and vulcanizing the whole to form an integral casing.

2. The method of forming a tire casing which comprises the steps of forming a loosely braided rope, conforming the rope to a U-shape cross section, embedding the conformed strands in rubber to completely fill the spaces between the strands and form inner and outer facings, suitably vulcanizing the resulting structure, applying an outer tread to the outer facing, and vulcanizing the whole to form an integral casing.

3. The method of forming a tire casing which comprises the steps of forming a loosely braided rope, conforming the rope to a U-shape cross section, embedding the conformed strands in rubber, and suitably vulcanizing the resulting structure.

4. The method of forming a tire casing which comprises the steps of forming a loosely braided rope having strands interwoven with strands at the opposite sides thereof, conforming the rope to a cross section corresponding to that of the casing with the bead strands at the edges thereof, embedding the conformed strands in rubber, to completely fill the spaces between the strands and form inner and outer facing for the fabric, vulcanizing the resulting structure, applying an outer tread to the outer facing, and vulcanizing the whole to form an integral casing.

5. The method of forming a tire casing which comprises the steps of forming a loosely braided rope, conforming the rope to a cross section corresponding to that of the casing, embedding the conformed strands in rubber to completely fill the spaces between the strands and form inner and outer facing for the fabric, vulcanizing the resulting structure, applying an outer tread to the outer facing, and vulcanizing the whole to form an integral casing.

6. The method of forming a tire casing which comprises the steps of forming a loosely braided rope, conforming the rope to a cross section corresponding to that of the casing, embedding the conformed strands in rubber to completely fill the spaces between the strands and form inner and outer facing for the fabric, and vulcanizing the resulting structure.

7. The method of forming a tire casing which comprises the steps of forming a loosely braided rope, conforming the rope to a cross section corresponding to that of the casing, embedding the conformed strands in rubber, and vulcanizing the resulting structure.

In witness whereof, I have hereunto set my hand and seal in the presence of two witnesses.

SILAS C. RAND. [L. S.]

Witnesses:
ROBERT L. FRENCH,
CHAS. C. BRECHT.